(12) United States Patent
Jäger

(10) Patent No.: US 11,874,845 B2
(45) Date of Patent: Jan. 16, 2024

(54) CENTRALIZED STATE DATABASE STORING STATE INFORMATION

(71) Applicant: Fortinet, Inc., Sunnyvale, CA (US)

(72) Inventor: Thorsten Jäger, Zurich (CH)

(73) Assignee: Fortinet, Inc., Sunnyvale, CA (US)

(*) Notice: Subject to any disclaimer, the term of this patent is extended or adjusted under 35 U.S.C. 154(b) by 390 days.

(21) Appl. No.: 15/636,530

(22) Filed: Jun. 28, 2017

(65) Prior Publication Data
US 2019/0005100 A1 Jan. 3, 2019

(51) Int. Cl.
*G06F 16/21* (2019.01)
*G06F 16/2458* (2019.01)
*G06F 15/173* (2006.01)
*G06F 16/2457* (2019.01)

(52) U.S. Cl.
CPC ........ *G06F 16/2471* (2019.01); *G06F 15/173* (2013.01); *G06F 16/21* (2019.01); *G06F 16/2457* (2019.01)

(58) Field of Classification Search
USPC ........................................................ 707/770
See application file for complete search history.

(56) References Cited

U.S. PATENT DOCUMENTS

| | | | | |
|---|---|---|---|---|
| 6,988,208 | B2* | 1/2006 | Hrabik | H04L 63/1433 709/224 |
| 9,111,088 | B2* | 8/2015 | Ghai | G06F 21/55 |
| 9,264,509 | B1* | 2/2016 | Zhou | H04L 67/2842 |
| 9,900,332 | B2* | 2/2018 | Muddu | G06F 16/24578 |
| 11,165,750 | B1* | 11/2021 | H R | H04L 63/0209 |
| 2002/0188538 | A1* | 12/2002 | Robertson | G06Q 10/063112 705/35 |
| 2008/0133518 | A1* | 6/2008 | Kapoor | G06F 9/505 |
| 2013/0042323 | A1* | 2/2013 | Narayanaswamy | H04L 63/1408 709/224 |
| 2014/0094159 | A1* | 4/2014 | Raleigh | H04W 24/02 455/418 |
| 2014/0173731 | A1* | 6/2014 | Mantripragada | H04L 12/66 726/22 |
| 2014/0181267 | A1* | 6/2014 | Wadkins | H04L 69/163 709/219 |
| 2014/0337509 | A1* | 11/2014 | Manghirmalani | G06F 11/3433 709/224 |

(Continued)

*Primary Examiner* — Grace Park
(74) *Attorney, Agent, or Firm* — Law Office of Dorian Cartwright; Dorian Cartwright

(57) ABSTRACT

Systems and methods for a cloud state engine are provided. According to one embodiment, a query pertaining to state information associated with a packet to be processed by a first packet processing device of multiple packet processing devices associated with a distributed security environment is received by a centralized state engine running on a computing device associated with the distributed security environment. The state information associated with the packet influences how the packet is to be processed by the first packet processing device. Responsive to the query, the state information is identified by the centralized state engine by processing the received query with reference to a state database containing state information for multiple packets. The identified state information is provided to the first packet processing device by generating a response to the query containing the identified state information.

18 Claims, 9 Drawing Sheets

(56) References Cited

U.S. PATENT DOCUMENTS

| | | | |
|---|---|---|---|
| 2015/0010012 A1* | 1/2015 | Koponen | H04L 63/0263 |
| | | | 370/411 |
| 2016/0269439 A1* | 9/2016 | Ho | H04L 47/33 |
| 2016/0373349 A1* | 12/2016 | Porat | H04L 45/38 |
| 2017/0026301 A1* | 1/2017 | Keller | H04L 47/621 |
| 2017/0085486 A1* | 3/2017 | Chung | H04L 67/1029 |
| 2017/0099196 A1* | 4/2017 | Barsheshet | H04L 49/70 |
| 2017/0199751 A1* | 7/2017 | Sama | G06F 9/45533 |
| 2017/0288998 A1* | 10/2017 | Kim | H04L 41/0654 |
| 2018/0091557 A1* | 3/2018 | Komu | H04L 63/0218 |
| 2018/0176139 A1* | 6/2018 | Mortensen | H04L 63/1458 |

* cited by examiner

500

| PACKET IDENTIFIER | FLOW STATE INFORMATION | SESSION STATE INFORMATION | 5 TUPLE STATE INFORMATION | | | | |
|---|---|---|---|---|---|---|---|
| | | | SOURCE IP | DESTINATION IP | SOURCE PORT | DESTINATION PORT | PROTOCOL |
| 10793 | FLOW STATE 1 | USER LOGIN | 192.168.124.100 | 81.209.179.69 | 50272 | 80 | IPv6 |
| 12306 | FLOW STATE 2 | USER LOGOUT | 145.125.124.200 | 56.520.176.32 | 60278 | 60 | IPv4 |
| . . . | . . . | . . . | . . . | . . . | . . . | . . . | . . . |
| 45896 | FLOW STATE N | HTTP REQUEST/RESPONSE | 122.152.152.200 | 52.523.124.38 | 89452 | 96 | IPv6 |

//  # CENTRALIZED STATE DATABASE STORING STATE INFORMATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to security state information database in a network. In particular, embodiments of the present invention relate to systems and methods for efficient storage and retrieval of state information to/from a centralized state database on behalf of distributed state producers/consumers in a network.

Description of the Related Art

Networks are becoming more dynamic. This is visible in solutions like software-defined networking (SDN) and the overall trend of virtualization. One of the basic principles of SDN and virtualization is the separation between control and data (e.g., the control plane and the data plane); however, in a distributed security environment, information regarding a state (e.g., a firewall state, a session state, a flow state, etc.) is required by applications, virtualization hosts (e.g., hypervisors), packet forwarding planes, network security devices and other packet processing devices to make decisions regarding how to handle received network traffic.

Existing packet processing devices typically run their own respective state tables, and make their own decisions as to how a packet is to be treated, and therefore each device has its own local policy engine coupled with a local state. Such local processing creates inconsistencies in packet forwarding, which may lead to inaccurate and inefficient forwarding decisions and may also require reprocessing of a packet with respect to a given activity/function. For instance, whether a packet has already been scanned by an Intrusion Prevention System (IPS) engine would not be known to a downstream packet processing engine based on existing packet state information that is stored locally within a downstream packet processing device, and therefore such scanning may be unnecessarily repeated, thereby consuming additional resources and processing time.

SUMMARY

Systems and methods are described for a cloud state engine. According to one embodiment, a query pertaining to state information associated with a packet to be processed by a first packet processing device of multiple packet processing devices associated with a distributed security environment is received by a centralized state engine running on a computing device associated with the distributed security environment. The state information associated with the packet influences how the packet is to be processed by the first packet processing device. Responsive to the query, the state information is identified by the centralized state engine by processing the received query with reference to a state database containing state information for multiple packets. The identified state information is provided to the first packet processing device by generating a response to the query containing the identified state information.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
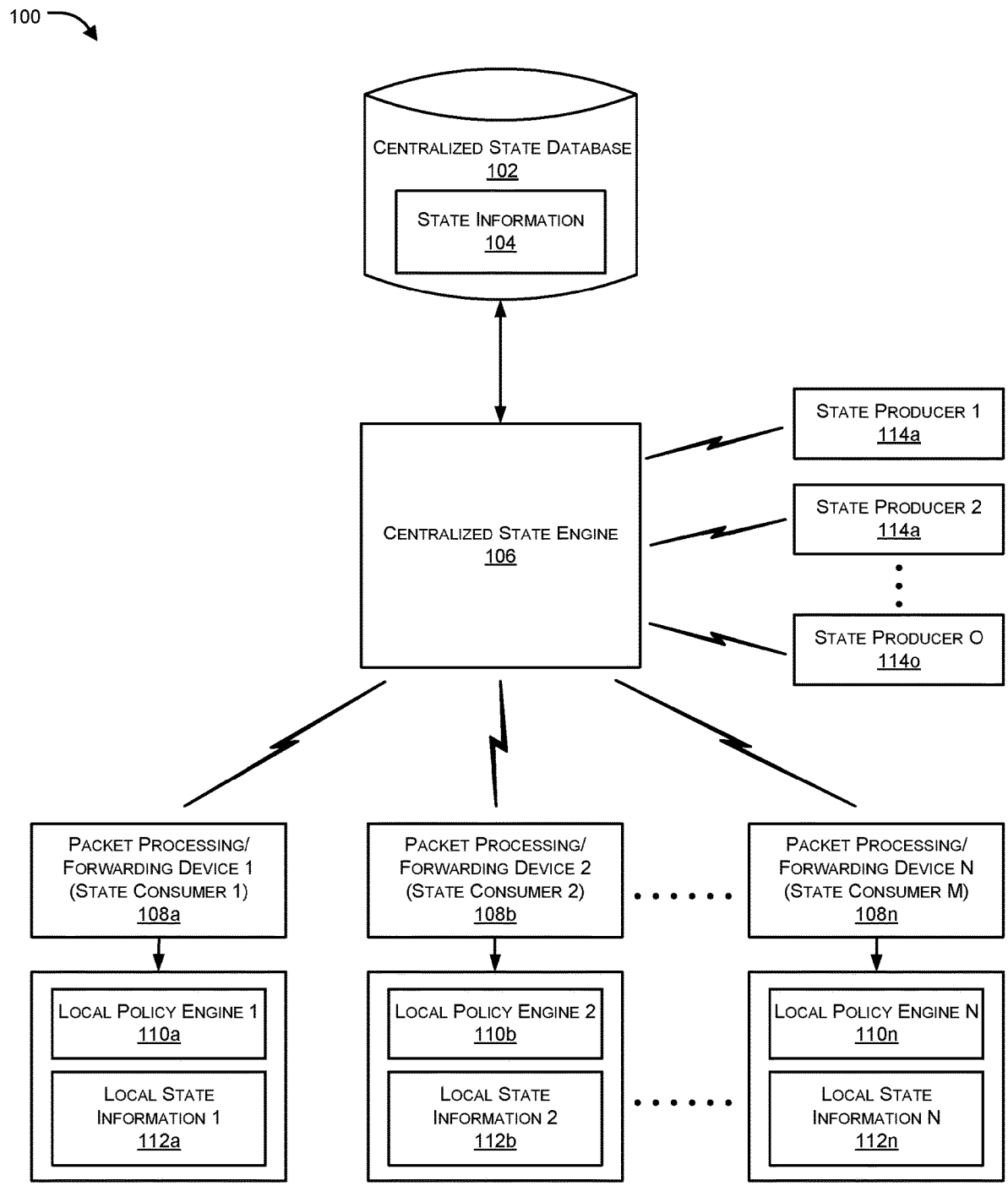
FIGS. 1A and 1B illustrate exemplary high-level network architectures in which a cloud state engine may be used in accordance with embodiments of the present invention.

Systems and methods are described for a cloud state engine. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "state" generally refers to information about, for example, a condition or attribute of or a context for, a thing at a particular time. Non-limiting examples of state include association with a network flow (e.g., a Session Initiation Protocol (SIP) flow) or security controls applied to a network flow (e.g., has the flow already been inspected by IPS and/or has an antivirus scanning already been performed on the flow), metadata associated with a packet or a flow (e.g., indicative of processing or scanning that has been performed thereon, actions taken thereon and/or security ratings associated therewith), an application state, a firewall state, a flow state, a connection state, a session state, Dynamic Host Configuration Protocol (DHCP) lease out, Internet Protocol (IP) pool addresses or Network Address Translation (NAT) ports being issued by a network, 5-tuple session information or a reputation state of an end-to-end packet flow, cookie based sessions, certificate based sessions and General Packet Radio Service (GPRS) Tunneling Protocol (GTP) Packet Data Protocol (PDP) context.

The phrase "security device" generally refers to a hardware device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Systems and methods of the present disclosure may be described herein in the context of a centralized state engine that may be configured in the cloud as a cloud state engine. While various embodiments of the present invention are described in the context of a distributed security environment, the cloud state engine described herein has broad applicability to other environments, including, but not limited to cloud application design and virtual distributed network layers. In the context of cloud application design, a principle is to separate the application from its respective state (never store a state with the application). In current network architectures, as the location of a virtual entity is not known at a given time, state information should be made available to it wherever it is needed. In the context of a virtual distributed network layer, a shared state can include DHCP-lease out, IP-Pool-Addresses, NAT ports or Routing Information (e.g., Routing Table) being issued by the network and the like.

Embodiments of the present invention generally relate to a security state information database in a network. In particular, embodiments of the present invention relate to systems and methods for efficient storage and retrieval of state information to/from a centralized state database on behalf of distributed state producers/consumers associated with a network.

In an aspect, the present disclosure relates to a computing device configured in a distributed security environment and operatively coupled in communication with multiple packet processing devices. The computing device includes one or more processors; and a centralized state engine operatively coupled with a local or remote state database that stores state information. In an aspect, the centralized state engine can be configured to receive a query pertaining to a packet received by a state consumer packet processing device of the packet processing devices; and responsive to the query, provide at least a part of stored state information pertaining to the packet to the state consumer packet processing device.

Non-limiting examples of packet processing devices include any or a combination of a network security device, an application device, a host device, a virtualization host, a packet-forwarding device, or a packet-processing module configured therein. A packet processing device's or module's role as a state producer or a state consumer is not mutually exclusive and is not necessarily a permanent condition. As such, a packet processing device or module may be a state producer, a state consumer or both at different times.

In an aspect, the stored state information is provided to the state consumer either on-demand (e.g., responsive to a request) or by, periodically or responsive to a triggering event (e.g., receipt of an update to the state information at issue), pushing the state information by the centralized state engine to the state consumer.

In an aspect, the state database can be configured to enable creation, modification and/or deletion of state information by state producer packet processing devices or modules.

In an aspect, a state consumer may initially check for the existence of the desired state information within its local cache, and issue the query for same when the desired state information does not exist within the local cache. In an aspect, the centralized state engine resides within the cloud and can be configured to provide the stored state information pertaining to the packet or flow at issue to one or more state consumers simultaneously.

The present disclosure further relates to a system within in a distributed security environment and having a non-transitory state database storing state information and one or more processors coupled to the state database and operable to execute one or more routines, including: a state database management module, which when executed by the one or more processors, manages creation, modification and/or deletion of state information within the state database; a query receive module, which when executed by the one or more processors, receives a query pertaining to a packet received by a packet processing device; a state database based query processing module, which when executed by the one or more processors, processes the received query to determine the stored state information pertaining to the query; and a query response module, which when executed by the one or more processors, transmits the stored state information to the requesting packet processing device.

In an aspect, the present disclosure relates to a distributed security environment comprising a centralized state engine, coupled to a network, which facilitates decoupling of state storage from packet processing and multiple packet processing devices coupled to the network. The centralized state engine includes an interface through which state information can be created, modified, deleted and retrieved. The packet processing devices include one or more state producers and one or more state consumers, wherein the one or more state producers create, modify and/or delete state information associated with an end-to-end packet flow by interacting with the centralized state engine, and wherein the one or more state consumers determine appropriate processing to be applied to a packet associated with the end-to-end packet flow by retrieving the state information from the centralized state engine, thereby relieving the state consumer from having to maintain (other than potentially caching) the local state information regarding the end-to-end packet flow.

Figure 1B:
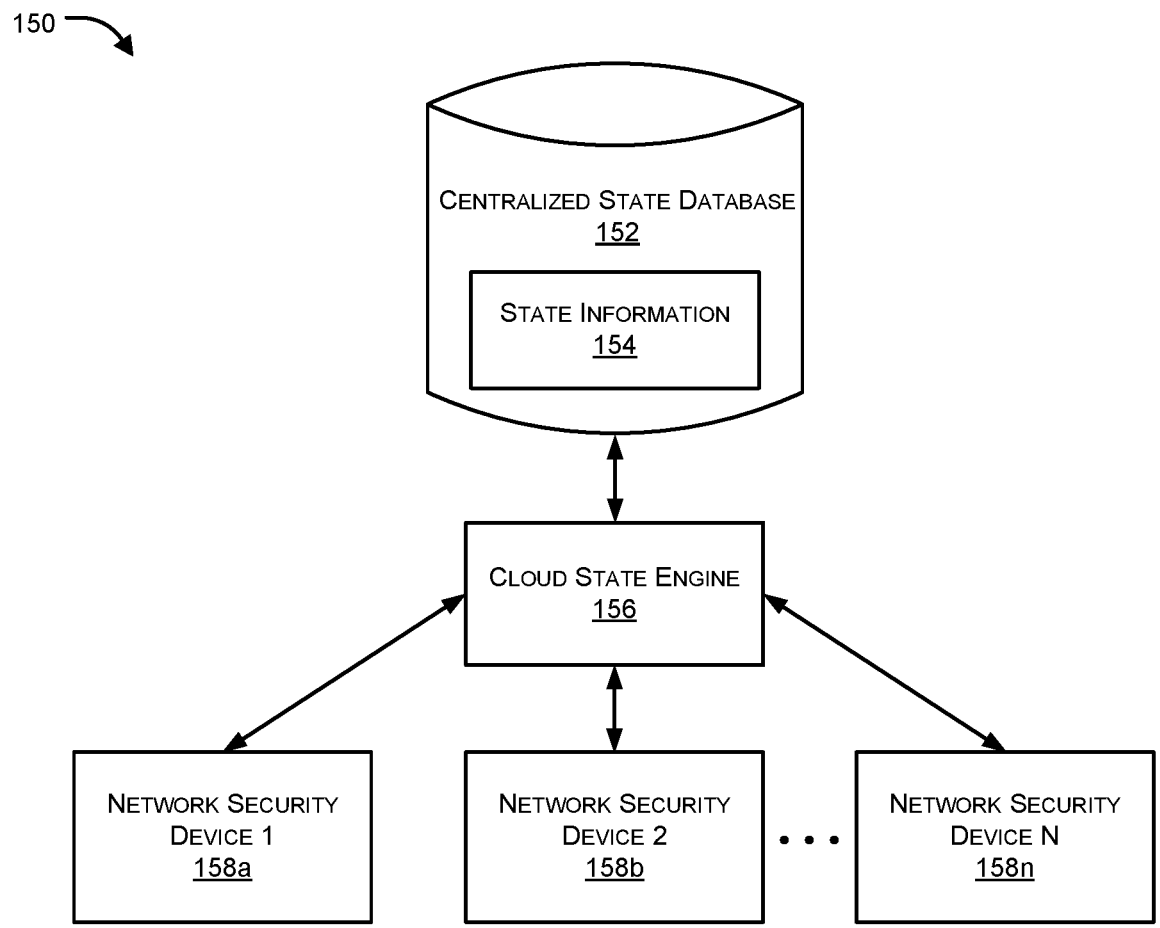

FIGS. 1A and 1B illustrate exemplary high-level network architectures in which a centralized state engine/cloud state engine 106 may be used in accordance with exemplary embodiments of the present invention. Centralized state engine 106 acts as repository of state information associated with network flows and provides the state information to various state consumers as required.

As illustrated in FIG. 1A, a centralized state engine 106 can be operatively connected to a centralized state database 102 (which may be interchangeably referred to as state database 102 herein). State database 102 contains therein state information 104 pertaining to a number of packets or flows as determined and reported by one or more state producers. By storing state information 104, centralized state engine 106 facilitates the decoupling of state storage from packet processing. Centralized state engine 106 includes an interface through which state information 104 can be created, modified, deleted and retrieved. In an exemplary embodiment, centralized state engine 106 may also include state database 102. Alternatively, state database 102 may implemented separately from centralized state engine 106.

In an aspect, a network having the centralized state engine 106 can further include a number of packet processing devices 114 that can be one or more state producers shown as 114a, 114b . . . 114o (collectively referred to as 114 hereinafter) and/or can be state consumers shown as 108a, 108b . . . 108n (collectively referred to as 108 hereinafter), wherein the one or more state producers 114 can create, modify and/or delete state information associated with an end-to-end packet flow by interacting with centralized state engine 106, and wherein the one or more state consumers 108 can determine appropriate processing to be applied to a packet associated with a particular end-to-end packet flow by retrieving the latest/updated state information for the end-to-end packet flow from centralized state engine 106. In this manner, state consumers need not independently maintain state information regarding the end-to-end packet flow.

Those skilled in the art will appreciate any device or module that produces/varies/submits state information to the state database can be referred to as a state producer, while devices or modules that consume/use/request such state information (for example, an application, hypervisor or packet processing device) can be referred to as a state consumer. As noted above, it will also be appreciated that the same device or module can act a state producer, a state consumer or both for a particular network flow or for different network flows at differing times and depending upon the context.

In another aspect, state consumers 108 may also use/interact with local state information 112 and local policy engine 110 to determine appropriate processing to be applied to a packet associated with the end-to-end packet flow, when so required (for example, when centralized state engine 106 and/or centralized state database 102 are inaccessible or unavailable for any reason). Local policy engine 110 and local state information 112 can be configured within corresponding state consumer 108 or can be operatively connected to it. The locally cached state information can also be used to avoid repeated requests for state information from centralized state database 102 by caching previous results received from centralized state database 102. For example, when local state information 112 is present in cache of a state information consumer device, it can be determined whether the state information remains valid, and if so, then the local state information can be used for packet processing; otherwise, updated/new/modified state information can be retrieved from state database 102 by sending a query to centralized state engine 106. As can be appreciated, local state information can be periodically flushed and replaced by updated state information provided by centralized database 102. In an exemplary embodiment, state consumer 108 can be a packet processing/forwarding device.

In an aspect, centralized state engine 106 can be included in a computing device comprising one or more processors, wherein the computing device can be configured, in an exemplary embodiment, in a distributed security environment and can be operatively coupled with one or more of packet processing devices, which may include state producers 114 and state consumers 108 along with any other device that is directly or indirectly responsible for packet processing. Such devices can further be embodied in any computing device including but not limited to, personal computers, laptops, mobile phones, smart devices, smart phones, tablet PCs, gaming console, IoT device, or any other device that involved network packet processing.

In another aspect, state engine 106 can receive a query from a packet processing device pertaining to a packet to be processed by the packet processing device. Responsive to the query, state engine 106 may provide at least a part of the stored state information pertaining to the packet or flow at issue to the requesting packet processing device. Depending upon the particular implementation, centralized state database 102 can be locally or remotely accessible to centralized state engine 106.

In yet another aspect, the state information can be selected from any or a combination of session state information, network security device related state information, flow state information, 5-tuple state information, and security control based state information.

In an aspect, the requesting packet processing device (such as any state consumer 108a or 108b, for instance) can be selected from any or a combination of a network security device, an application device, a host device, a virtualization host, a packet-forwarding device, or a packet-processing module configured therein.

In another aspect, the at least a part of the stored state information can be provided to the requesting packet processing device either on-demand (i.e., responsive to an explicit request from the packet processing device), or by pushing the at least a part of the stored state information on its own by centralized state engine 106. In yet another aspect, the at least a part of the stored state information can be pushed by centralized state engine 106 when it receives an update to the state information at issue (e.g., from a state producer 114a or 114b).

In this manner, state consumers have access to updated/latest state information either as a result of issuance of a query to centralized state engine 106 or a result of a push by centralized state engine 106.

In an aspect, the at least a part of the stored state information can be pushed by a second packet processing device/state producer to state database 102 (and then to the first packet processing device/state consumer), wherein the second packet processing device (also interchangeably referred to as peer device) can be selected from the one or more known packet processing devices.

In another aspect, centralized state database 102 can be configured to enable creation, modification and/or deletion of state information. As elaborated above, the one or more state producers 114 can add, delete and modify/update state information and the updated state information can be stored in centralized state database 102. As already described, engine 106 can facilitate decoupling of state storage from packet processing, and can provide an interface (e.g., a Representational state transfer (REST) or RESTful Application Programming Interface (API) or the like) through which state information can be added, deleted, modified and retrieved.

In yet another aspect, the state information stored by centralized state database 102 may also include metadata indicative of processing (e.g., IPS scanning and/or AV scanning) that has already been performed upstream on a particular packet. Such metadata information can include and represent any processing action that took place on the packet, such as whether the packet was earlier blocked or allowed or filtered or indicative of the type of evaluation/processing that was done on the packet, or the kind of security rating/ranking that the packet was given during security processing. Metadata information can also include, for instance, source-destination IP details of the packet, number of packets that have the same source-destination IP information, among any other packet processing level information that may be configured to be stored as metadata.

In an aspect, a state consumer packet processing device can initially check for the existence of the desired state information within its local cache, and can issue the query when the desired state information is not present within its local cache. In this manner a network configured with proposed engine 106 can use fewer computing resources and reduce exposure to network latency.

In another aspect, the centralized state engine 106 can reside within the cloud as cloud state engine 156 as described with reference to FIG. 1B.

As shown in FIG. 1B, various network security devices (examples of state consumers) shown collectively as 158 can query cloud state engine 156 regarding state information associated with various packets being received by them. Engine 156 can in turn retrieve updated state information 154 from state database 152 and can return the updated state information to the relevant network security devices 158. Security devices 158 can use the updated state information to process their respective packets. Alternatively, security devices 158 can employ their local policy engines along with state information 154 to determine how to process their respective packets.

In yet another aspect, centralized state engine 106 can be configured as a system configured in a distributed security environment, wherein said system can include a non-transitory state database storing state information and one or more processors coupled to the state database and operable to execute one or more routines, wherein the one or more routines can include: a state database management module, which when executed by the one or more processors, can manage creation and modification of the state information within the state database and deletion of the state information from the state database; a query receive module, which when executed by the one or more processors, can receive a query pertaining to an input packet from a first packet processing device that forms part of one or more of packet processing devices; a state database based query processing module, which when executed by the one or more processors, can process the received query at the state database to determine at least a part of the stored state information pertaining to the input packet; and a query response module, which when executed by the one or more processors, can transmit a response having the at least a part of the stored state information to the first packet processing device. It can be appreciated that herein the first packet processing device is acting as a state consumer.

In an aspect, present invention proposes a network system comprising a centralized state engine 106 that facilitates decoupling of state storage from packet processing, the centralized state engine 106 having an interface through which state information can be added, deleted, modified and retrieved; and one or more of packet processing devices, coupled to the network, including one or more state producers 114 and one or more state consumers 108, wherein the one or more state producers 114 can add, delete and modify state information associated with an end-to-end packet flow by interacting with the centralized state engine 106 and wherein the one or more state consumers 108 can determine appropriate processing to be applied to a packet associated with the end-to-end packet flow based on the state information by retrieving the state information from the centralized state engine 106 and without maintaining local state information regarding the end-to-end packet flow.

In another aspect, state consumers 108 may use local state information 112 and local policy engine 110 to determine appropriate processing to be applied to a packet associated with the end-to-end packet flow. Local policy engine 110 and local state information 112 can be configured within corresponding state consumer 108 or can be operatively connected to it. In an exemplary embodiment, state consumer 108 can be a packet processing/forwarding device.

In another aspect, the proposed engine 106 can be configured to send updated state information associated with a packet or a network flow to multiple state consumers simultaneously. For example, a pre-configured number of firewalls of a packet switched network can get updated state information regarding a packet or network flow that it has already been checked by an anti-virus system for indications regarding the existence of malware. All such firewalls can accordingly avoid scanning the packet while processing it, thereby saving on computing resources and lowering latency of the network.

In yet another aspect, state information can be any parameter that a state consumer may require to process or forward a packet. For example, it can be an Anti Virus flag set by an antivirus application (a state producer here) after a packet has been scanned to indicate to other downstream packet processing device(s) that duplicative scanning need not be performed on the packet. State information can be derived from multiple packet streams and have multiple associations not restricted to those being elaborated here. Further, state database 102 being a repository of up-to-date state information, can be protected to avoid unauthorized manipulation of the state information to avoid any security lapses. For similar reasons, queries and their responses over the network (particularly untrusted networks) may also be strongly encrypted and authenticated.

In an aspect, state database 102 can be a high performance database with very fast operations such as for insert, modify, and delete. Changes can be sent to relevant packet processing devices as incremental updates to save on transmission time and bandwidth.

In yet another aspect, centralized state engine 106 can include or be operatively connected to a centralized policy engine that can look up policies as required and enable various packet processing/forwarding devices (state consumers) to take appropriate processing/forwarding decisions. The centralized policy engine can aggregate and store all local policy engines of state consumers in the network. In such a case, local policy engines may not be needed. Upon update of any state information (by a state producer), state engine 106 can check with the centralized policy engine as to whether a state consumer may need it and if so, forward the updated state information to the state consumer immediately without waiting for a query from the state consumer. The state consumer can store the updated store information in its local state information 112 and use it as required. In this manner, a state consumer can always have access to latest state information required by it.

In an exemplary embodiment, the present disclosure can find use in distributed security systems and those employing virtual machines. Such security systems and virtual machines can have access to updated state information of any packet quickly by directly querying state engine 106, or by state engine 106 pushing updated state information as soon as such security systems come online or the virtual machines are created, for example.

Figure 2A:
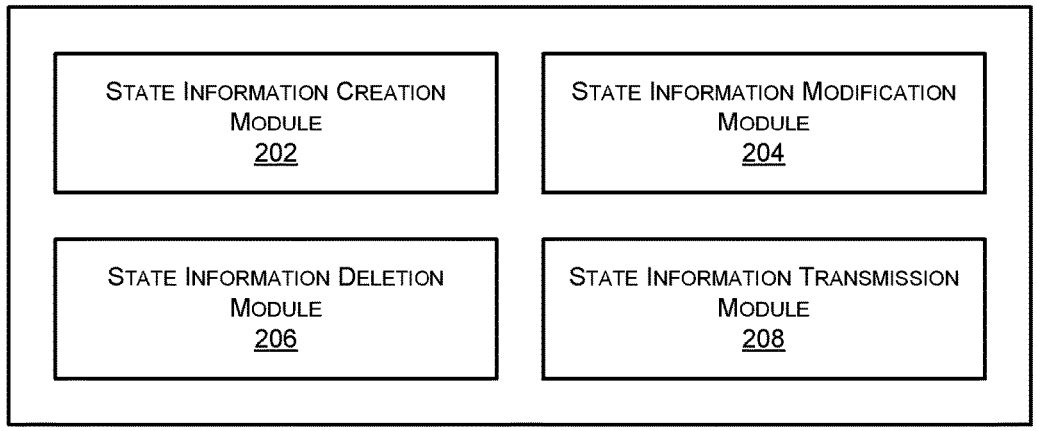
FIGS. 2A and 2B illustrate exemplary functional module diagrams at state producers' and state consumers' ends, respectively, in accordance with an embodiment of the present invention.

FIG. 2A illustrates exemplary functional modules implemented by a State Producer (SP) in accordance with an exemplary embodiment of the present disclosure. In an aspect, a state producer 200 can include a state information creation module 202, a state information modification module 204, a state information deletion module 206, and a state information transmission module 208. In an exemplary embodiment, state producer 200 can be any or a combination of a scanning device e.g., a firewall, a gateway device, an Intrusion Detection System (IPS), an Intrusion Prevention System (IPS) or a UTM appliance.

In another aspect, state producer 200 can create state information for a packet that may be associated with an end-to-end packet flow using module 202, wherein the state information can include any or a combination of session state information, network security device related state information, flow state information, 5-tuple state information (Source IP, Destination IP, Source Port, Destination Port, and Protocol), security control based state information and the like. In an aspect, such state information can either be generated automatically by the state producer (selected from a list of available packet processing devices such as network security devices) or by actual processing of the packet to retrieve the state information.

In yet another aspect, state information modification module 204 can be configured to enable a state producer to modify state information created by module 202, while deletion module 206 can enable deletion of the state information created by the module 202 or modified by the module 204. Such modification/deletion actions can be performed on the state database that stores the state information of one or more packets. In an aspect, such modification can be done automatically whenever updated state information is generated for the same packet by the same or another packet processing device (state producer). In an aspect, such modification can be done in such a manner that the earlier stored state information is overwritten. Upon any change in state information of a packet, state information transmission module 208 can transmit the changed (updated) state information to the centralized state engine that can store the updated state information in centralized state database.

In an exemplary embodiment, an Intrusion Prevention System (IPS) can act as a state producer while scanning packets in a manner such that once it has finished scanning a packet, module 202 of the IPS can create, for example, a Boolean data type with value 1 that can be incorporated in state information of the packet and module 208 can transmit the changed state information to the centralized state engine that can store this state information in its state database for further use as elaborated hereunder.

In another exemplary embodiment, module 206 can delete any state information already existing in a packet. For example, if a system/user requires that a packet be scanned again at a pre-determined state consumer, after it has been scanned earlier at another state consumer, module 206 can reset a state information value of the packet that indicates such scan to its initial/null value so that the pre-determined state consumer scans it again, if required/approved by its policy engine. Appropriate APIs can be provided to enable a user to achieve this. In yet another exemplary embodiment, present disclosure can change a state information after a pre-determined number of hops across various packet processing devices. For example, present invention can be configured to automatically scan a packet after every ten hops i.e. after it has been forwarded/processed through ten packet processing/forwarding devices. For this purpose, creation module 202 can create a state information such as a counter, modification module 204 can increment the counter by one for every packet processing, and information transmission module 208 can send updated state information after ten such increments to centralized state engine. The centralized state engine can in turn immediately push the updated state information to state consumers configured to receive it and those of the state consumers whose local policy engine, upon receipt of the updated state information, determines that the packet has to be scanned, can be triggered/configured to do so.

In an aspect, a state producer can include one or more processor cores that can be used to generate and transmit state information to state database. Such processor cores can execute instructions, preferably parsing instructions, related to parsing tasks of a parsing engine, for instance, and also perform other data manipulation tasks such as fetching parsing instructions from a state-graph unit, for example. In an aspect, the processor cores can include, for example, general processing cores, network processing cores, multiple instruction multiple data cores, parallel processing elements, controllers, multithreaded processing cores, or any other devices for processing instructions, such as an Xtensa core by Tensilica Inc. of Santa Clara, Calif., a MIPS core by MIPS Technologies, Inc. of Mountain View, Calif., or an ARM core by ARM Inc. of Los Gatos, Calif.

Figure 2B:
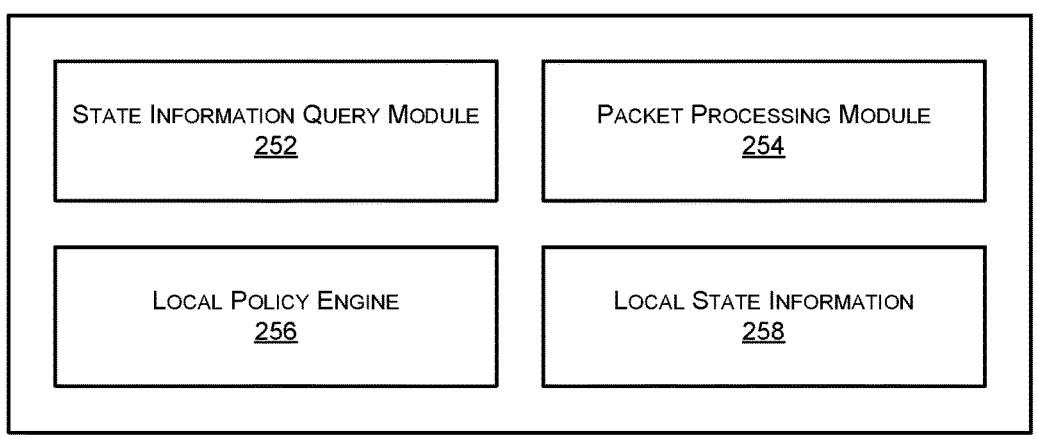

FIG. 2B illustrates an exemplary State Consumer showing its various parts, in accordance with an exemplary embodiment of the present disclosure.

In an aspect, a state consumer 250 can include a state information query module 252 and a packet processing module 254. In another aspect, a state consumer 250 can be operatively connected to local policy engine 256 and can have local state information 258. In an exemplary embodiment, policy engine 256 and local state information 258 can reside within state consumer 250 itself. In an aspect, a state consumer 250 can use module 252 to transmit a query regarding state information of a packet it is processing to centralized state engine proposed in the present disclosure. Upon receipt of such inquiry, the centralized state engine can respond with latest/updated state information of the packet. State consumer 250 can process this state information according to its local policy engine 256 and based upon such processing; packet processing module 254 can further process the packet.

In an exemplary embodiment elaborated above, an Intrusion Prevention System can act as a state producer while scanning packets. Once it has finished scanning a packet, module 202 of the IPS can create, for example, a Boolean data type with value 1 that can be incorporated in state information of the packet and module 208 can transmit the changed state information to the centralized state engine that can store this state information in its state database for further use as elaborated hereunder. When state consumer 250 receives this packet for further processing, it can use module 252 to transmit a query to the proposed centralized state engine regarding state information of the packet and the centralized state engine can respond with updated state information indicating, by Boolean data type with value 1, that the packet has been scanned by an Intrusion Prevention System, as elaborated above. State consumer 250 can process updated state information according to its local policy engine 256 and based upon such processing; packet processing module 254 can further process the packet. In this instance, for example, local policy engine 256 may determine no further scanning of the packet is required since it has already been scanned, thereby saving precious computing resources and time.

In another exemplary embodiment, state consumer 250 can use local state information 258 as required. For example, the packet may be of a data type that local state information 258 may indicate does not require scanning anyways and is simply to be routed to next state consumer. In this case, state consumer 250 need not query the proposed centralized state engine and can straightaway process the packet as required, thereby saving computing resources and time.

It can be appreciated that any device that varies state information can be a state producer while another that uses such state information can be a state consumer. It can also be appreciated that the same device can both be a state producer as well as a state consumer, depending upon how it interacts with various packets.

Figure 3:
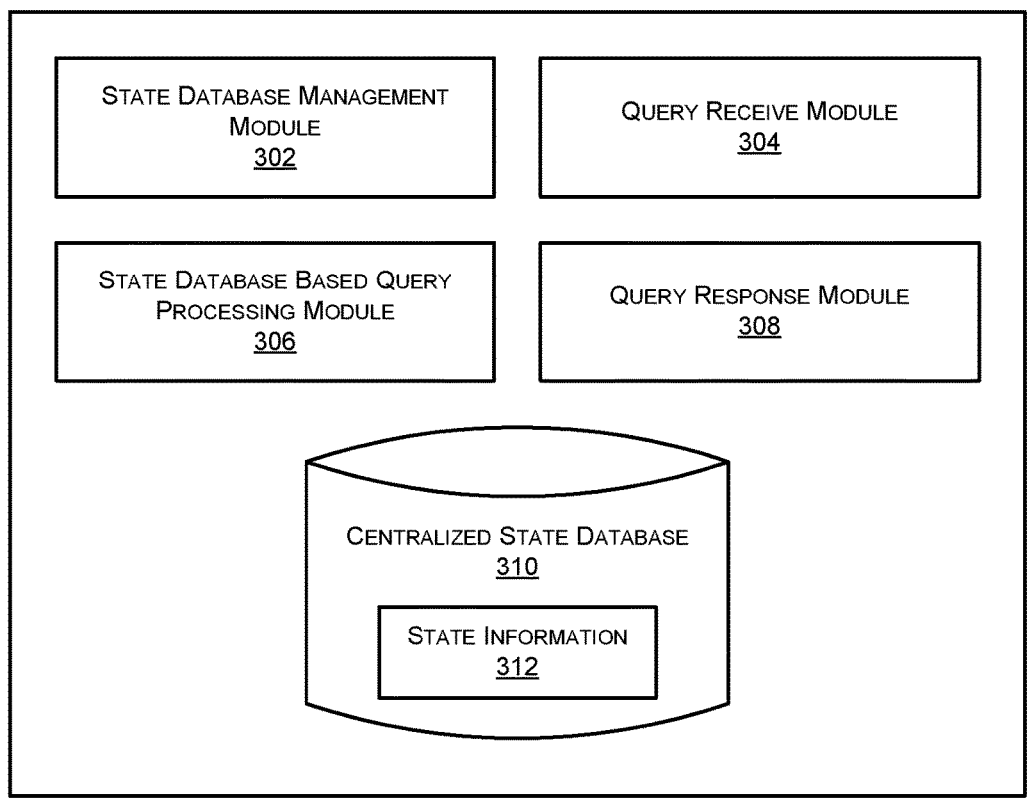
FIG. 3 illustrates an exemplary module diagram of a centralized state engine and a state database in accordance with an embodiment of the present invention.

FIG. 3 illustrates an exemplary module diagram of a centralized state engine and a state database in accordance with an embodiment of the present invention.

In an aspect, a centralized state engine 300 as described herein can be configured as a system in a distributed security environment and can include (or be operatively connected to) a non-transitory state database (shown as 310) storing state information (312) and can have one or more processors coupled to the state database 310 that are operable to execute one or more routines, wherein the one or more routines can include those implemented by modules as described hereunder.

In an aspect, the centralized state engine 300 can include a state database management module 303, a query receive module 304, a state database based query processing module 306 and a query response module 308.

In another aspect, state engine 300 can be operatively connected to a centralized state database 310 (interchangeably termed as state database 310) that can store state information 312 of a packet and likewise, state information of all packets being processed by various packet processing devices that are operatively connected to the centralized state engine 300. In an exemplary embodiment, state database 310 can reside within state engine 300 itself, as shown.

In an aspect, the state database management module 302 can manage creation and modification of state information 312 associated with a particular packet within state database 310 and deletion of state information 312 associated with a particular packet from state database 310 based on directives received from various packet processing devices participating within the distributed security environment as state producers. In an exemplary embodiment, for this purpose module 302 can interact with state producer 200 as elaborated above.

In an aspect, state information creation module 202 of state producer 200 can create state information for a packet that may be associated with an end-to-end packet flow as elaborated above. Module 208 of state producer 200 can send this created state information shown as 312 in FIG. 3) to state database 310 where it can be stored as state information 312. Module 204 of state producer can modify the state information, while module 206 can delete state information created by module 202. Such modification/deletion actions can be done on the state database 310 that stores the state information 312 of one or more packets. In an aspect, such modification can be done automatically whenever updated state information is generated for the same packet by the same or another packet processing device (state producer), overwriting the earlier stored state information. In a similar manner, upon any change in state information of a packet, state information transmission module 208 can transmit the changed (updated) state information to centralized state engine 300 that can store the updated state information 312 in centralized state database 310.

In another aspect, the query receive module 304 can receive a query pertaining to an input packet being processed by a packet processing device (say a first packet processing device) that can be a state consumer. Likewise, module 304 can receive queries from the various packet processing devices. In an exemplary embodiment, for this purpose module 304 can interact with state consumer 250 as elaborated above.

In yet another aspect, the state database based query processing module 306 can process the query (or a number of queries) received by module 304 by querying the state database 310 to determine at least a part of the stored state information 312 pertaining to corresponding input packet being processed by the first packet processing device, and likewise for the various packet processing devices.

In another aspect, the query response module 308 can transmit a response having the at least a part of the stored state information to the first packet processing device, and likewise to the various packet processing devices.

In this manner, the various packet processing devices (state consumers) can get updated state information pertaining to various packets being processed by them at any time and can take further actions accordingly.

In alternate exemplary embodiments, centralized state engine as described above can be operatively coupled with one or more network sniffers as a software configuration or a hardware device that can take snapshots of a network packet data, including state information thereof without altering any. Snapshots of state information of a packet can be taken at pre-determined points in the network (for example, after processing by a packet forwarding device), or at random intervals and compared. In event of detection of any state information change between two consequent snapshots, such as modification, deletion or addition of the any state information, centralized state engine of present invention can trigger an alert that can be monitored by a user who can take appropriate actions accordingly using interfaces provided. Or, the state information change can be acted upon by a local policy engine of a packet processing device to determine further action on the packet, as described above. Such sniffers can include, amongst others, WireShark, tcpdump (a command-line tool for Linux and other Unix-based operating systems), GlassWire, CloudShark, Microsoft Message Analyzer (for Windows) and the like.

Figure 4:
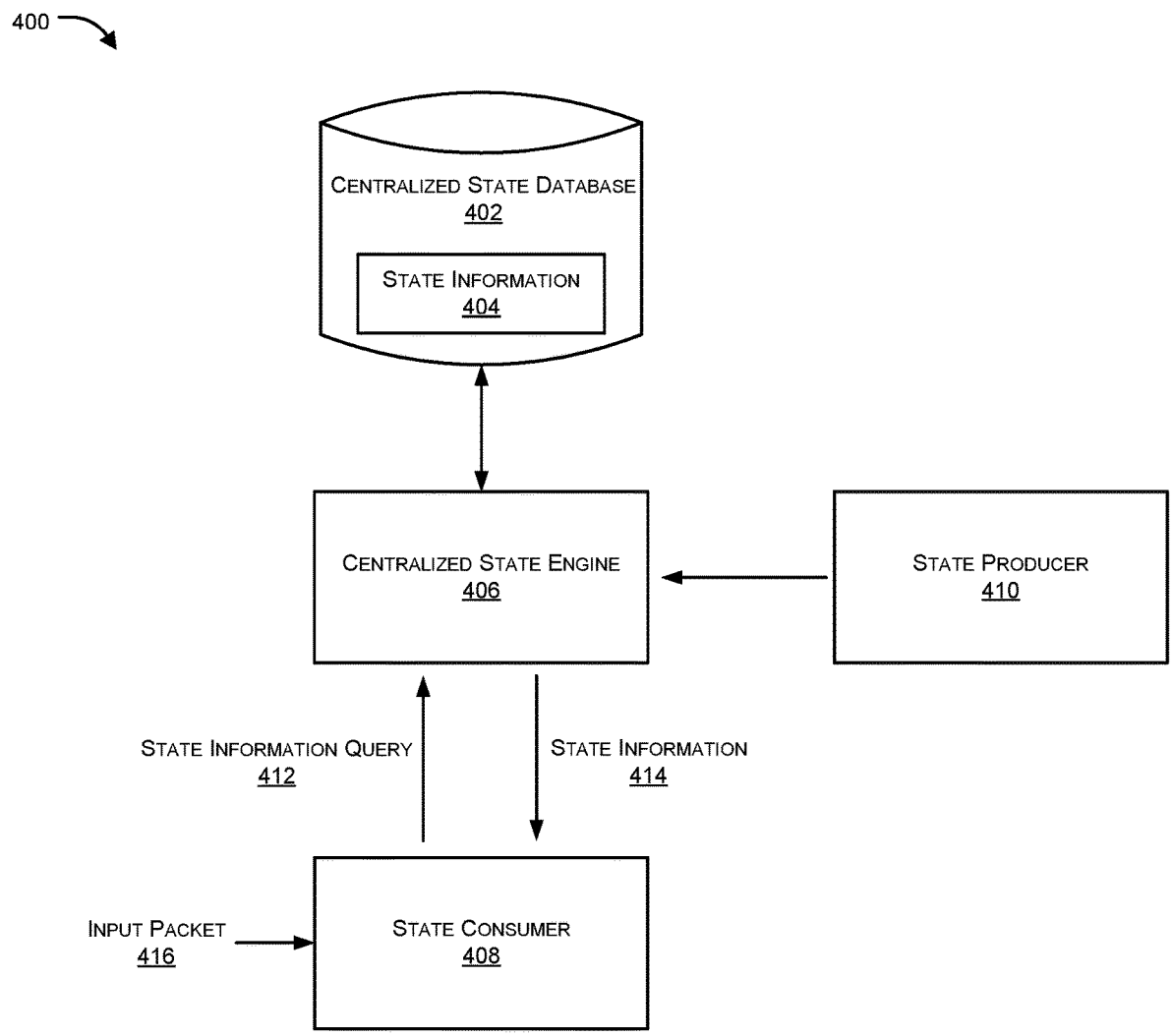
FIG. 4 illustrates interactions among a state engine, state producers and state consumers in accordance with an exemplary embodiment of the present invention.

FIG. 4 illustrates interactions among a centralized state engine 406, state producers 410 and state consumers 408 in accordance with an exemplary embodiment of the present invention. State producer 410 can transmit updated state information associated with a packet 416 to centralized state engine 406 and centralized state engine 406 can store the updated state information as state information 404 in centralized state database 402.

In another aspect, upon receipt of packet 416 by the state consumer 408 (which can be a packet forwarding device, for example) for processing, state consumer 408 can generate a state information query 412 that state consumer 408 can send to centralized state engine 406. Engine 406 can retrieve the updated state information associated with packet 416 from database 402 and can return it (in the form of state information 414) to state consumer 408. State consumer 408 may then use state information 414 in accordance with its local policy to determine how to process packet 416, as described above.

Figure 5:
FIG. 5 illustrates a centralized state database table for storing state information in accordance with an exemplary embodiment of the present invention.

FIG. 5 illustrates a centralized state database table for storing state information in accordance with an exemplary embodiment of the present invention. As described above a centralized state database can store state information for various packets. In an aspect, state information for a packet can include any or a combination of packet identifier, flow state information, session state information and 5-tuple state information.

In another aspect, the 5-tuple state information can include source IP, destination IP, source port, destination port and protocol. A "state" can contain more information than a 5-tuple, including, but not limited to, metadata from various Packet-Headers (e.g., vxlan, nsh, a tenant-ID and the like).

In an exemplary embodiment, each packet can have a unique packed identifier (e.g., a flow identifier or the like) with which other state information can be associated, as shown in FIG. 5.

In such a manner, state database can store state information associated with various packets. Anytime any state information is updated, state database can be accordingly updated so as to maintain up-to-date state information that can then be provided to state consumers where and when required, as described above. The state database can be operatively connected to centralized state engine of the present disclosure, or can be included in the centralized state engine itself.

Those skilled in the art will appreciate that any state information can be created and subsequently monitored in accordance with embodiments of the present invention. For example, state information can include how many times a packet has been forwarded, and further, IP addresses of all the devices that have forwarded the packet. In another exemplary embodiment, state information can include a time stamp showing when the packet was last scanned for malware. A time value of the state information can be updated so as to finally enable the packet to be scanned again after a pre-determined time at a state consumer, configuring centralized state engine accordingly.

In yet another exemplary embodiment, a network node serving as a relay between IP networks can carry out packet processing such as modifying a header of a packet and searching a destination table provided in the node for a destination to which the packet is to be routed. Such destination can be provided as part of the updated state information sent by the network node (that is acting as a state producer here) to the centralized state engine. The state engine may have already determined from updated state information received relating to another packet that the destination is potentially infected by malware and can, hence, immediately stop the packet from being forwarded to or received from the destination.

Figure 6:
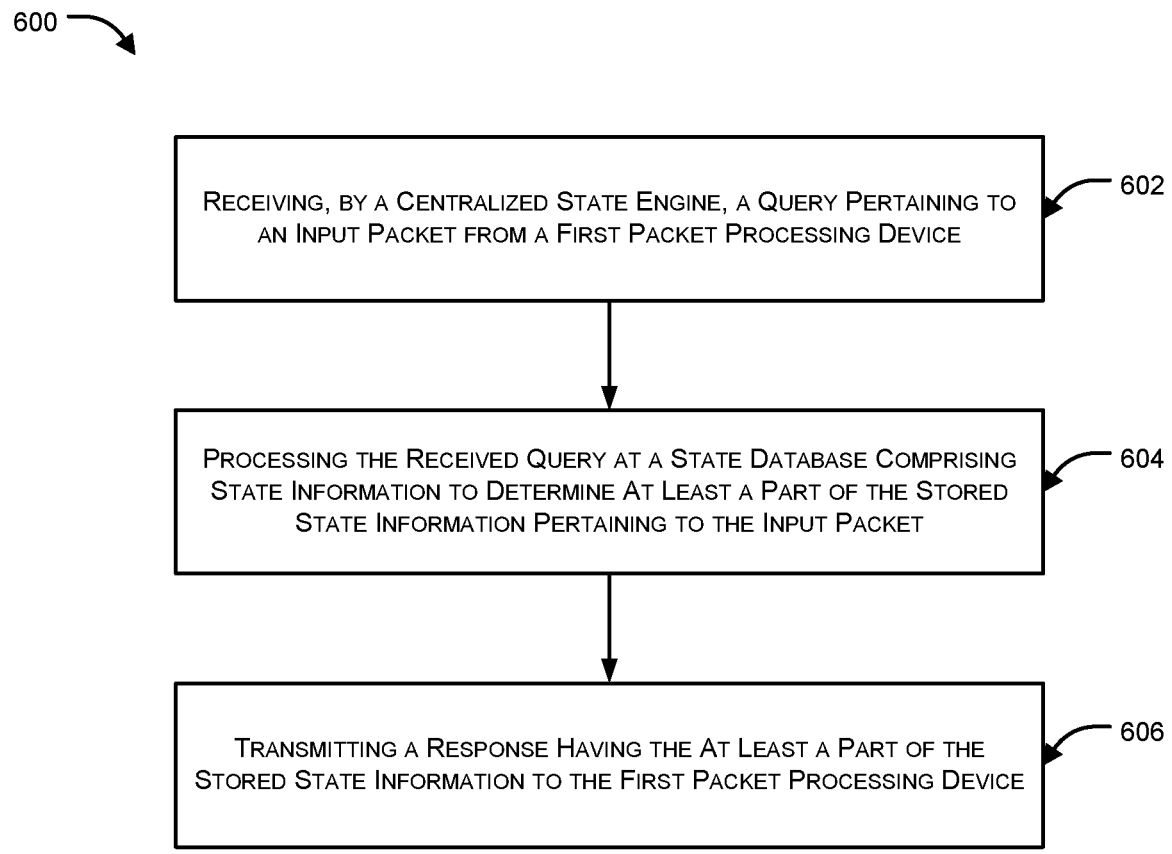
FIG. 6 is a flow diagram illustrating state information query processing responsive to receipt of a query from a state consumer in accordance with an exemplary embodiment of the present invention.

FIG. 6 is a flow diagram illustrating state information query processing responsive to receipt of a query from a state consumer in accordance with an exemplary embodiment of the present invention. In an aspect, step 602 of the state information query processing responsive to receipt of a query can include, receiving, by a centralized state engine, a query from a first packet processing device (a state consumer) pertaining to an input packet.

In another aspect, step 604 can include processing, by the centralized state engine, the received query with reference to a state database comprising state information, to determine at least a part of the stored state information pertaining to the packet at issue.

In yet another aspect, step 606 can include transmitting a response having the at least a part of the stored state information to the first packet processing device.

In this manner, the centralized state engine can transmit state information pertaining to various packets being processed by various packet processing devices to them and the packet processing devices can take further actions according to such state information. For this purpose, the packet processing devices may use their local policy engines.

Figure 7:
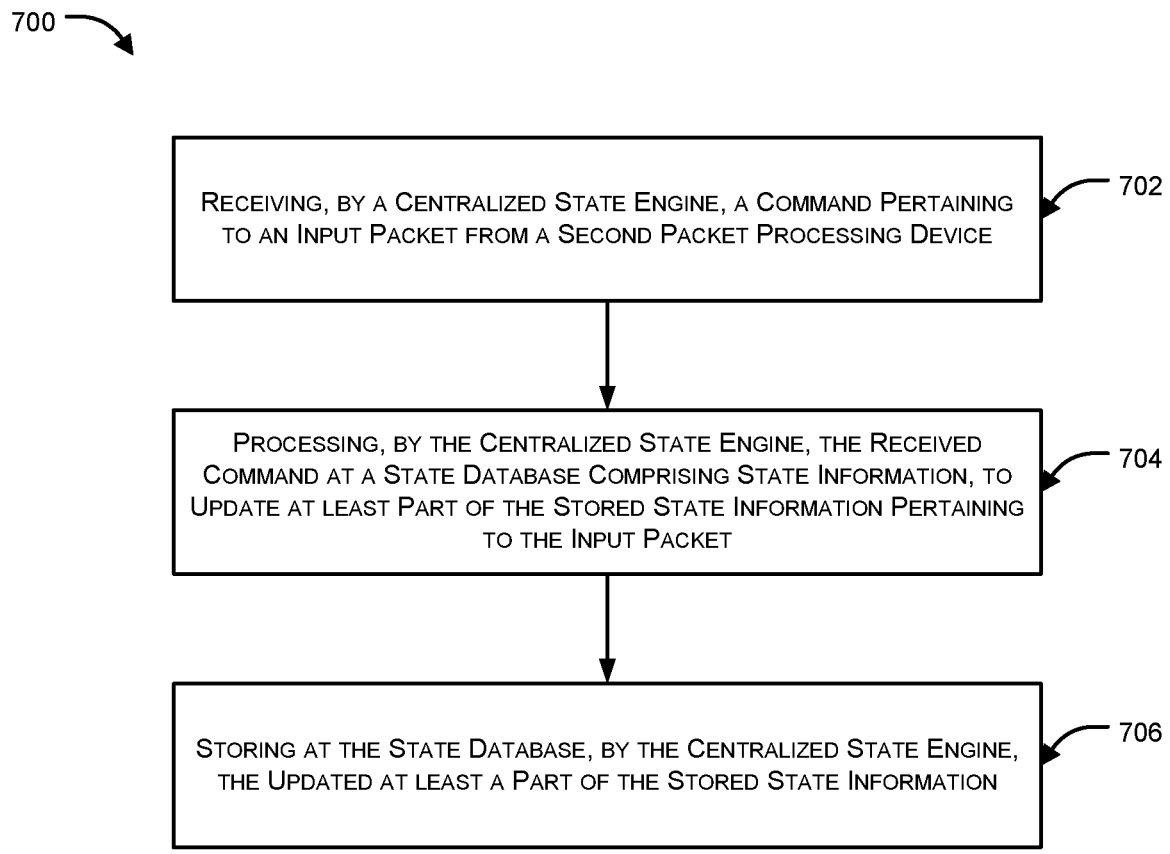
FIG. 7 is a flow diagram illustrating state information command processing responsive to receipt of a command from a state producer in accordance with an exemplary embodiment of the present invention.

FIG. 7 is a flow diagram illustrating state information command processing responsive to receipt of a command from a state producer in accordance with an exemplary embodiment of the present invention. In an aspect, step 702 of the state information command processing responsive to receipt of a command can include receiving, by a centralized state engine, a command pertaining to a packet from a second packet processing device (a state producer).

In an aspect, the command can be any or a combination of creation, modification or deletion of a state information.

In another aspect, step 704 can include processing, by the centralized state engine, the received command with respect to a state database comprising state information, to update at least a part of the stored state information pertaining to the packet at issue.

In yet another aspect, step 706 can include storing at the state database, by the centralized state engine, the updated at least a part of the stored state information.

Figure 8:
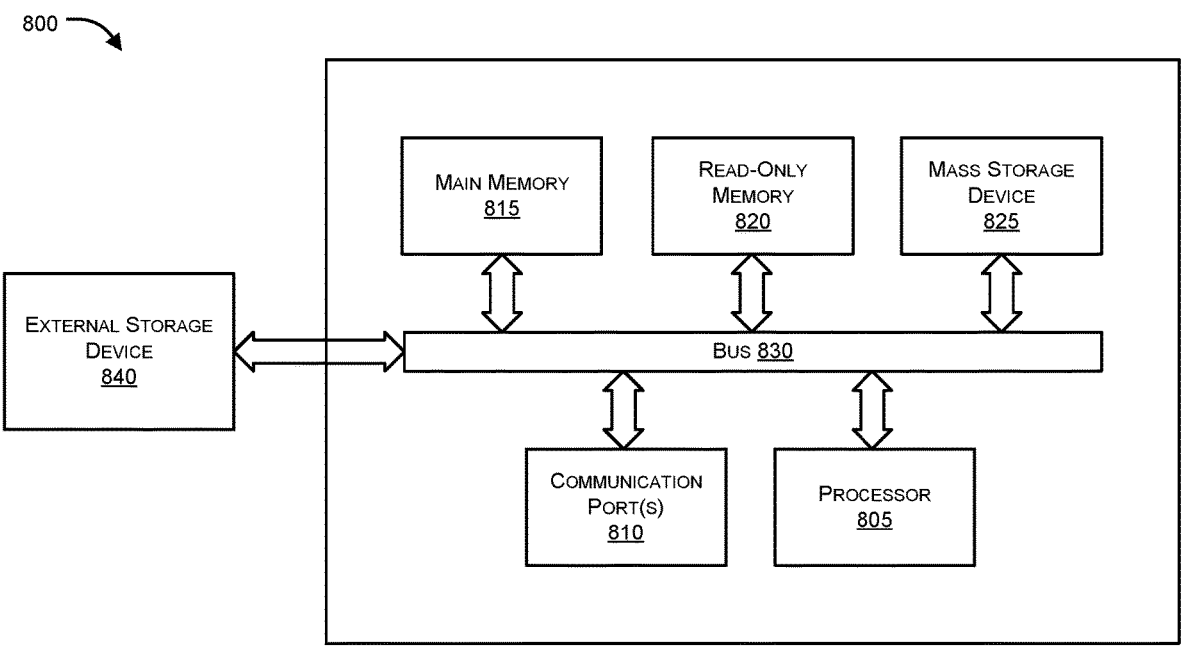
FIG. 8 illustrates an exemplary computer system in which or with which embodiments of the present invention may be utilized.

FIG. 8 illustrates an exemplary computer system in which or with which embodiments of the present invention may be utilized. Computer system 800 may represent a centralized state engine (e.g., centralized state engine 106, 156, 300 or 406) and/or a centralized state database (e.g., centralized state database 102, 152, 310 or 402).

As shown, computer system 800 comprises a bus 830, a processor 805, communication port 810, a main memory 815, an external storage device 840, a read-only memory 820 and a mass storage device 825. Computer system 800 may comprise more than one processor and communication ports.

Examples of processor 805 comprise, but are not limited to, an Intel® Itanium® or Itanium® 2 processor(s), or AMD® Opteron® or Athlon MP® processor(s), Motorola® lines of processors, FortiSOC™ system on a chip processors or other processors. Processor 805 may comprise various modules associated with embodiments of the embodiments herein.

Communication port 810 may be any of an RS-232 port for use with a modem based dialup connection, a 10/100 Ethernet port, a Gigabit or 10 Gigabit port using copper or fiber, a serial port, a parallel port, or other existing or other ports. Communication port 810 may be chosen depending on a network, such a Local Area Network (LAN), Wide Area Network (WAN), or any network to which computer system 800 connects.

Memory 815 may be Random Access Memory (RAM), or any other dynamic storage device commonly used. Read-only memory 820 may be any static storage device(s); e.g., but not limited to, a Programmable Read Only Memory (PROM) chips for storing static information; e.g. start-up or BIOS instructions for processor 805.

Mass storage device 825 may be any type of mass storage solution, which may be used to store information and/or instructions. Exemplary mass storage solutions comprise, but are not limited to, Parallel Advanced Technology Attachment (PATA) or Serial Advanced Technology Attachment (SATA) hard disk drives or solid-state drives (internal or external; e.g., having Universal Serial Bus (USB) and/or Firewire interfaces), and one or more optical discs, Redundant Array of Independent Disks (RAID) storage; e.g. an array of disks (e.g., SATA arrays).

Bus 830 communicatively couples processor(s) 805 with the other memory, storage and communication blocks. Bus 830 may be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to a software system.

Optionally, wire operator and administrative interfaces; e.g., a display, keyboard, and a cursor control device, may also be coupled to bus 830 to support direct operator interaction with computer system 800. Other operator and administrative interfaces may be provided through network connections connected through communication port 810. External storage device 840 may be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system 800 limit the scope of the embodiments herein.

What is claimed is:

1. A method in a centralized state engine on a security device of a distributed security environment having a plurality of packet processing devices communicatively coupled to a data communication network comprising:
    facilitating decoupling of state storage from packet processing within the distributed security environment by maintaining state information in a state database for each of a plurality of end-to-end packet flows,
    wherein the state information for a particular end-to-end packet flow of the plurality of end-to-end packet flows influences how a packet associated with the particular end-to-end packet flow is processed by the plurality of packet processing devices,
    wherein the state information further comprises security state information from an IPS (Intrusion Prevention System) representing progress of packet security scanning as reported by a plurality of packet processing devices participating in the distributed security environment over the data communication network and which operate at different times as state producers or state consumers,
    wherein the state information associated with the packet is created responsive to receiving the state information associated with the packet from at least two packet processing devices of the plurality of packet processing devices, each packet processing device providing, in the state information, metadata information representing one or more packet processing actions performed upstream in the particular end-to-end packet flow by the packet processing device;
    receiving from a first packet processing device of the plurality of packet processing devices, by the centralized state engine, a query pertaining to state information associated with a packet to be processed by the first packet processing device, wherein the state information associated with the packet to be processed influences how the packet is to be processed by the first packet processing device;
    responsive to the query, identifying, by the centralized state engine, the state information for the particular end-to-end packet flow based on the query by processing the received query with reference to the state database; and
    providing, by the centralized state engine, the first packet processing device with the identified state information by generating a response to the query containing the identified state information.

2. The method of claim 1, wherein the state information for the plurality of packets comprises any or a combination of session state information, network security device related state information, flow state information, 5-tuple state information, and security control based state information.

3. The method of claim 2, wherein the first packet processing device comprises any or a combination of a network security device, an application device, a host device, a virtualization host, a packet-forwarding device, or a packet-processing module configured therein.

4. The method of claim 1, further comprising pushing to the first packet processing device, by the centralized state engine, the state information associated with the packet responsive to receipt by the centralized state engine of an update to the state information associated with the packet.

5. A computer system with a centralized state engine on a security device of a distributed security environment having a plurality of packet processing devices communicatively coupled to a data communication network, the system wherein the computer system comprises:
    a non-transitory storage device having embodied therein instructions representing a state engine; and
    one or more processors coupled to the non-transitory storage device and operable to execute the state engine to perform a method comprising:
    facilitating decoupling of state storage from packet processing within the distributed security environment by maintaining, in a state database, state information for each of a plurality of end-to-end packet flows,
    wherein the state information further comprises security state information from an IPS (Intrusion Prevention System) representing progress of packet security scanning as reported by a plurality of packet processing devices participating in the distributed security environment over the data communication network and which operate at different times as state producers or state consumers,
    wherein the state information associated with the packet is created responsive to receiving the state information associated with the packet from at least two packet processing devices of the plurality of packet processing devices, each packet processing device providing, in the state information, metadata information representing one or more packet processing actions performed upstream in the particular end-to-end packet flow by the packet processing device;
    receiving from a first packet processing device of the plurality of packet processing devices a query pertaining to state information associated with a packet to be processed by the first packet processing device, wherein the state information associated with the packet to be processed influences how the packet is to be processed by the first packet processing device;
    responsive to the query, identifying the state information for the particular end-to-end packet flow based on the query by processing the received query with reference to the state database; and providing the first packet processing device with the identified state information by generating a response to the query containing the identified state information, wherein the identified state information indicates that no further scanning is necessary responsive to the security state information indicative of a completed IPS scan.

6. The computer system of claim 5, wherein the state information for the plurality of packets comprises any or a combination of session state information, network security device related state information, flow state information, 5-tuple state information, and security control based state information.

7. The computer system of claim 6, wherein the first packet processing device comprises any or a combination of a network security device, an application device, a host device, a virtualization host, a packet-forwarding device, or a packet-processing module configured therein.

8. The computer system of claim 5, wherein the method further comprises pushing to the first packet processing device the state information associated with the packet responsive to receipt by the centralized state engine of an update to the state information associated with the packet.

9. A method in a centralized state engine on a security device of a distributed security environment having a plurality of packet processing devices communicatively coupled to a data communication network comprising:

facilitating decoupling of state storage from packet processing by maintaining in a database, by a cloud-based state engine running on a computing device and associated with the distributed security environment, state information for each of a plurality of end-to-end packet flows, wherein the state information for a particular end-to-end packet flow of the plurality of end-to-end packet flows influences how a packet associated with the particular end-to-end packet flow is processed by the plurality of packet processing devices, wherein the state information further comprises security state information from an IPS (Intrusion Prevention System) representing progress of packet security scanning as reported by a plurality of packet processing devices participating in the distributed security environment over the data communication network and which operate at different times as state producers or state consumers, wherein the state information associated with the packet is created responsive to receiving the state information associated with the packet from at least two packet processing devices of the plurality of packet processing devices, each packet processing device providing, in the state information, metadata information representing one or more packet processing actions performed upstream in the particular end-to-end packet flow by the packet processing device, wherein the state information for the packet indicates that no further scanning is necessary responsive to the security state information indicative of a completed IPS scan;

receiving from a first packet processing device of the plurality of packet processing devices, by the cloud-based state engine, an update pertaining to the state information for the particular end-to-end packet flow of the plurality of end-to-end packet flows; and responsive to receipt of the update:
modifying, by the cloud-based state engine, the database to reflect the update; and pushing, by the cloud-based state engine, the update to a second packet processing device of the plurality of packet processing devices.

10. The method of claim 9, wherein the end-to-end packet flow comprises a session.

11. The method of claim 10, wherein the plurality of packet processing devices comprise network security devices associated with a private network.

12. The method of claim 10, wherein the first packet processing device comprises an Intrusion Detection System (IDS) and wherein the second packet processing device comprises a unified threat management (UTM) appliance.

13. The method of claim 10, wherein the update includes information indicative of one or more of a state of an application associated with the session, a state of antivirus scanning of the session, and a state of intrusion prevention scanning for the session.

14. A system with a centralized state engine on a security device of a distributed security environment having a plurality of packet processing devices communicatively coupled to a data communication network, the system comprising:

a processing resource; and a non-transitory computer-readable medium, coupled to the processing resource, having stored therein instructions that when executed by the processing resource cause the processing resource to:

facilitate decoupling of state storage from packet processing by maintaining in a database associated with the distributed security environment, state information for each of a plurality of end-to-end packet flows, wherein the state information for a particular end-to-end packet flow of the plurality of end-to-end packet flows influences how a packet associated with the particular end-to-end packet flow is processed by the plurality of packet processing devices, wherein the state information further comprises security state information from an IPS (Intrusion Prevention System) representing progress of packet security scanning as reported by a plurality of packet processing devices participating in the distributed security environment over the data communication network and which operate at different times as state producers or state consumers, wherein the state information associated with the packet is created responsive to receiving the state information associated with the packet from at least two packet processing devices of the plurality of packet processing devices, each packet processing device providing, in the state information, metadata information representing one or more packet processing actions performed upstream in the particular end-to-end packet flow by the packet processing device, wherein the state information for the packet indicates that no further scanning is necessary responsive to the security state information indicative of a completed IPS scan;

receive from a first packet processing device of the plurality of packet processing devices an update pertaining to the state information for the particular end-to-end packet flow of the plurality of end-to-end packet flows;

responsive to receipt of the update: modifying the database to reflect the update; and pushing the update to a second packet processing device of the plurality of packet processing devices.

15. The system of claim 14, wherein the end-to-end packet flow comprises a session.

16. The system of claim 15, wherein the update includes information indicative of one or more of a state of an application associated with the session, a state of antivirus scanning of the session, and a state of intrusion prevention scanning for the session.

17. The system of claim 14, wherein the plurality of packet processing devices comprise network security devices associated with a private network.

18. The system of claim 14, wherein the first packet processing device comprises an Intrusion Detection System (IDS) and wherein the second packet processing device comprises a unified threat management (UTM) appliance.

* * * * *